US012757868B2

(12) United States Patent
Blackstock

(10) Patent No.: US 12,757,868 B2
(45) Date of Patent: Oct. 13, 2026

(54) SYSTEMS AND METHODS FOR CONTINUOUS LIVESTOCK SUPPLY

(71) Applicant: Limin' Innovations LLC, Thomaston, GA (US)

(72) Inventor: Scott S. Blackstock, Thomaston, GA (US)

(73) Assignee: Limin' Innovations LLC, Thomaston, GA (US)

( * ) Notice: Subject to any disclaimer, the term of this patent is extended or adjusted under 35 U.S.C. 154(b) by 0 days.

(21) Appl. No.: 19/218,069

(22) Filed: May 23, 2025

(65) Prior Publication Data

US 2025/0280788 A1 Sep. 11, 2025

Related U.S. Application Data

(63) Continuation of application No. 18/483,116, filed on Oct. 9, 2023, now Pat. No. 12,310,330, which is a continuation of application No. 17/946,412, filed on Sep. 16, 2022, now Pat. No. 11,778,980, which is a continuation of application No. 17/245,074, filed on Apr. 30, 2021, now Pat. No. 11,497,191.

(51) Int. Cl.

*A01K 1/00* (2006.01)
*A01K 1/08* (2006.01)
*A01K 31/06* (2006.01)
*A22B 7/00* (2006.01)

(52) U.S. Cl.

CPC ................ *A01K 1/08* (2013.01); *A01K 31/06* (2013.01); *A22B 7/00* (2013.01)

(58) Field of Classification Search

CPC .. A01K 1/0029; A01K 1/0139; A01K 1/0151; A01K 31/22; A01K 1/08; A01K 1/05; A01K 1/12; A01K 1/126; A22B 7/00; A22C 21/0053

USPC ...................................... 119/510, 14.01–14.3

See application file for complete search history.

(56) References Cited

U.S. PATENT DOCUMENTS 2,910,044 A * 10/1959 King ...................... A01K 31/22 119/448
3,799,115 A * 3/1974 Fullerton ............. A01K 1/0029 119/843
3,805,741 A * 4/1974 Thompson ........... A01K 1/0029 119/843

(Continued)

*Primary Examiner* — Richard T Price, Jr.
(74) *Attorney, Agent, or Firm* — Troutman Pepper Locke LLP; Dustin B. Weeks; Korbin M. Blunck

(57) ABSTRACT

The disclosed technology includes systems and methods for continuously supplying livestock to a processing plant. The disclosed technology can include an enclosure configured to house livestock. The enclosure can include an enclosure entrance, an enclosure exit, and moveable walls to partition the enclosure into separate pens and automatically direct the livestock from the enclosure entrance toward the enclosure exit. A passageway can be connected to the enclosure exit and include moveable walls to automatically direct the livestock from the enclosure exit toward a processing plant. The moveable walls can be configured to move at a predetermined speed such that the plurality of livestock enter the enclosure as offspring, are reared in the enclosure, and are directed through the enclosure exit into the passageway approximately when the plurality of livestock have reached slaughter weight.

20 Claims, 6 Drawing Sheets

(56) References Cited

U.S. PATENT DOCUMENTS 3,908,597 A * 9/1975 Taylor .................. A01K 1/0114 209/374
3,908,599 A * 9/1975 Flocchini ............. A01K 1/0029 119/510
4,224,900 A * 9/1980 Truhan ................... A01K 31/18 119/448
4,445,460 A * 5/1984 Stencil ................. A01K 1/0029 119/510
4,726,154 A * 2/1988 Raptis .................. A01K 1/0005 52/64
5,622,141 A * 4/1997 Lareva ................. A01K 1/0029 119/843
5,673,647 A * 10/1997 Pratt ........................ A01K 5/02 119/842
6,000,361 A * 12/1999 Pratt .................... A01K 1/0023 119/842
6,024,164 A * 2/2000 Sorbel ..................... F28F 9/002 165/41
6,095,086 A * 8/2000 Aurik .................... A01J 5/0175 119/14.02
6,142,102 A * 11/2000 Mack ....................... A01K 1/04 119/720
6,205,951 B1 * 3/2001 Sprik ..................... A01K 1/105 119/60
6,477,984 B1 * 11/2002 Kleinsasser .......... A01K 1/0029 119/510
6,571,730 B1 * 6/2003 Norberg ................. A01K 29/00 119/14.03
6,810,832 B2 * 11/2004 Ford .................... A01K 1/0041 119/447
2003/0140865 A1 * 7/2003 Fuqua .................... A01K 29/00 119/174
2006/0130777 A1 * 6/2006 Adams ................. A01K 1/0236 119/843

* cited by examiner

SYSTEMS AND METHODS FOR CONTINUOUS LIVESTOCK SUPPLY

CROSS REFERENCE TO RELATED APPLICATIONS

This application continuation of, and claims priority under 35 U.S.C. § 120 to, U.S. patent application Ser. No. 18/483,116, now U.S. Pat. No. 12,310,330, filed 9 Oct. 2023, entitled "Systems and Methods For Continuous Livestock Supply," which is a continuation of U.S. Non-Provisional patent application Ser. No. 17/946,412, now U.S. Pat. No. 11,778,980, filed 16 Sep. 2022, entitled "Systems and Methods For Continuous Livestock Supply," which is a continuation of U.S. patent application Ser. No. 17/245,074, now U.S. Pat. No. 11,497,191, filed 30 Apr. 2021, entitled "Systems and Methods For Continuous Livestock Supply," the entire contents and substance of which are hereby fully incorporated herein by reference.

FIELD OF TECHNOLOGY

The disclosed technology relates generally to livestock supply systems and methods and, more particularly, to continuous livestock supply systems and methods.

BACKGROUND

For centuries, humans have been raising livestock for meat and other animal products such as eggs, milk, fur, leather, and wool. In more recent history, however, raising and processing livestock has become a more large-scale operation and often requires many different entities to produce a final animal product. For example, broilers (or chickens raised for meat) are generally raised in grow houses and freighted to a processing plant to produce chicken meat. Broiler production typically requires at least an integrator, a grower, and a processor. The integrator typically supplies the chicks, the feed, consulting during the growing process, and transportation of the broilers to the processing plant while growers rear the broilers and the processor processes the broiler to obtain usable meat and other byproducts.

Like much of livestock production, broiler production is currently done in a batch-style process where fully-grown broilers are brought to a processing plant in batches. The broilers are generally reared at a site remote from the processing plant and freighted to the processing plant in crates. The process of transporting the broilers from the grow houses to the processing plant often causes unnecessary distress, injury, and even premature death to the broilers resulting in maltreatment of the broilers and lost profits. Furthermore, transporting the boilers to the processing plant increases the risk of injury to workers assisting in the transportation of the broilers to the processing plant because the broilers must be manually placed in crates and loaded on the truck for transport.

Furthermore, one of the biggest challenges currently facing the processing of livestock is the variation in size of livestock of similar age. For example, although a batch of broilers may be of age to be processed, some of the broilers in the batch are likely not of suitable size. This requires workers to manually sort the broilers and remove undersized broilers from the flock leading to further inefficiency and potential injury to the broilers and/or the workers. More commonly, however, manual sorting of the broilers is impractical and therefore non-premium cuts are produced by the undersized broilers. Furthermore, the variation in broiler size limits automation of the evisceration process and often requires manual cutting of the broilers which can be a tedious and dangerous task for the workers.

Processing of livestock is further complicated by many processing plants requiring the livestock to stop feeding or drinking for a certain amount of time prior to processing of the livestock to ensure an effective evisceration process. This can be difficult to manage when the freighting time can vary greatly due to the inefficiencies associated with sorting, collecting, and transporting the livestock. Livestock processed too early results in a poor evisceration process while livestock processed too late experience greater stress and bring less revenue due to unnecessary weight loss.

What is needed, therefore, is a method and system of raising livestock to continuously supply the livestock to a processing plant without the inefficiencies currently associated with rearing, transporting, and processing livestock. These and other problems are addressed by the technology disclosed herein.

SUMMARY

The disclosed technology relates generally to livestock supply systems and methods and, more particularly, to continuous livestock supply systems and methods.

The disclosed technology can include a system for rearing livestock and directing the livestock toward a processing plant. The system can include an enclosure configured to house a plurality of livestock within the enclosure. The enclosure can include an enclosure entrance, an enclosure exit, and a first plurality of moveable walls configured to partition the enclosure into separate pens and automatically direct the plurality of livestock from the enclosure entrance toward the enclosure exit. The first plurality of moveable walls can be configured to move at a predetermined speed wherein the plurality of livestock enter the enclosure as offspring, are reared in the enclosure, and are directed through the enclosure exit into the passageway approximately when the plurality of livestock have reached slaughter weight.

The system can include a passageway connected to the enclosure exit and configured to be connected to a processing plant entrance. The passageway can include a second plurality of moveable walls configured to automatically direct the plurality of livestock from the enclosure exit toward the processing plant entrance.

The enclosure can include a plurality of reception pens proximate the enclosure entrance and configured to receive the plurality of livestock from the enclosure entrance.

The first plurality of moveable walls and the second plurality of moveable walls can each be configured to be moved from an ending position to a starting position. The first plurality of moveable walls and the second plurality of moveable walls can each be configured to be moved from the ending position to the starting position without directing the livestock from the ending position to the starting position. The first plurality of moveable walls and the second plurality of moveable walls can be configured to be lifted above the livestock to be moved from the ending position to the starting position.

The first plurality of moveable walls can be attached to a drive system. The drive system can be configured to move the first plurality of moveable walls at the predetermined speed.

The first plurality of moveable walls and the second plurality of moveable walls can be configured to transition between an extended position and a retracted position. The first plurality of moveable walls can be configured to extend to the extended position to automatically direct the plurality of livestock from the enclosure entrance toward the enclosure exit. The first plurality of moveable walls can be configured to retract to the retracted position to be moved from an ending position to a starting position.

The system can include a sizing wall configured to permit livestock of a first size to pass through an opening of the sizing wall and prevent livestock of a second size to pass through the opening of the sizing wall. The sizing wall can be configured to be adjusted between a first position and a second position to adjust the opening of the sizing wall.

The enclosure can include a sizing passageway and the sizing wall can be configured to permit the livestock of the first size to pass through the opening of the sizing wall from the separate pens into the sizing passageway and prevent the livestock of the second size to pass through the opening of the sizing wall from the separate pens into the sizing passageway. The sizing wall can be further configured to prevent the livestock of the first size from passing from the sizing passageway back to the separate pens.

The system can include at least a second enclosure and the passageway can be configured to be connected to the first enclosure and the second enclosure.

The disclosed technology can include a method of continuously supplying livestock to a processing plant. The method can include providing a first plurality of livestock and a second plurality of livestock. The method can include providing a first enclosure configured to house the first plurality of livestock and a second enclosure configured to house the second plurality of livestock.

The method can include placing the first plurality of livestock in the first enclosure and placing the second plurality of livestock in the second enclosure. The first enclosure can include a first enclosure entrance and a first enclosure exit while the second enclosure can include a second enclosure entrance and a second enclosure exit.

The method can include directing the first plurality of livestock from the first enclosure entrance to the first enclosure exit and directing the second plurality of livestock from the second enclosure entrance to the second enclosure exit. The method can include providing a passageway connected to the first enclosure exit, the second enclosure exit, and a processing plant entrance. The passageway can be configured to receive the first plurality of livestock from the first enclosure exit and the second plurality of livestock from the second enclosure exit.

The method can include directing the first plurality of livestock from the first enclosure exit toward the processing plant entrance and directing the second plurality of livestock from the second enclosure exit toward the processing plant. The first plurality of livestock can be placed in the first enclosure as offspring, reared in the first enclosure, and directed through the first enclosure exit into the passageway approximately when the first plurality of livestock has reached slaughter weight. Similarly, the second plurality of livestock can be placed in the second enclosure as offspring, reared in the second enclosure, and directed through the second enclosure exit into the passageway approximately when the second plurality of livestock has reached slaughter weight. The second plurality of livestock can reach slaughter weight after the first plurality of livestock.

The method can include a first moveable wall configured to automatically direct the plurality of livestock from the first enclosure entrance toward the first enclosure exit, a second moveable wall configured to automatically direct the second plurality of livestock from the second enclosure entrance toward the second enclosure exit, and a third moveable wall configured to automatically direct the first and second plurality of livestock from the first and second enclosure exit toward the processing plant.

The method can include providing a first drive system and a second drive system and connecting the first moveable wall to the first drive system and the second moveable wall to the second drive system. The first drive system can be configured to move the first moveable wall at a first predetermined speed such that the first plurality of livestock enter the first enclosure as offspring, are reared in the first enclosure, and are directed through the first enclosure exit into the passageway approximately when the first plurality of livestock has reached slaughter weight. Similarly, the second drive system can be configured to move the second moveable wall at a second predetermined speed such that the second plurality of livestock enter the second enclosure as offspring, are reared in the second enclosure, and are directed through the second enclosure exit into the passageway approximately when the second plurality of livestock has reached slaughter weight.

The method can include providing a sizing wall. The sizing wall can be configured to permit livestock of a first size to pass through an opening of the sizing wall and prevent livestock of a second size to pass through the opening of the sizing wall. The sizing wall can be configured to be adjusted between a first position and a second position to adjust the opening of the sizing wall.

The method can include proving a sizing passageway. The sizing wall can be configured to permit the livestock of the first size to pass through the opening of the sizing wall from the separate pens into the sizing passageway and prevent the livestock of the second size to pass through the opening of the sizing wall from the separate pens into the sizing passageway.

Additional features, functionalities, and applications of the disclosed technology are discussed herein in more detail.

BRIEF DESCRIPTION OF THE DRAWINGS

The accompanying drawings, which are incorporated in and constitute a part of this specification, illustrate multiple examples of the presently disclosed subject matter and serve to explain the principles of the presently disclosed subject matter. The drawings are not intended to limit the scope of the presently disclosed subject matter in any manner.

DETAILED DESCRIPTION

Figure 1:
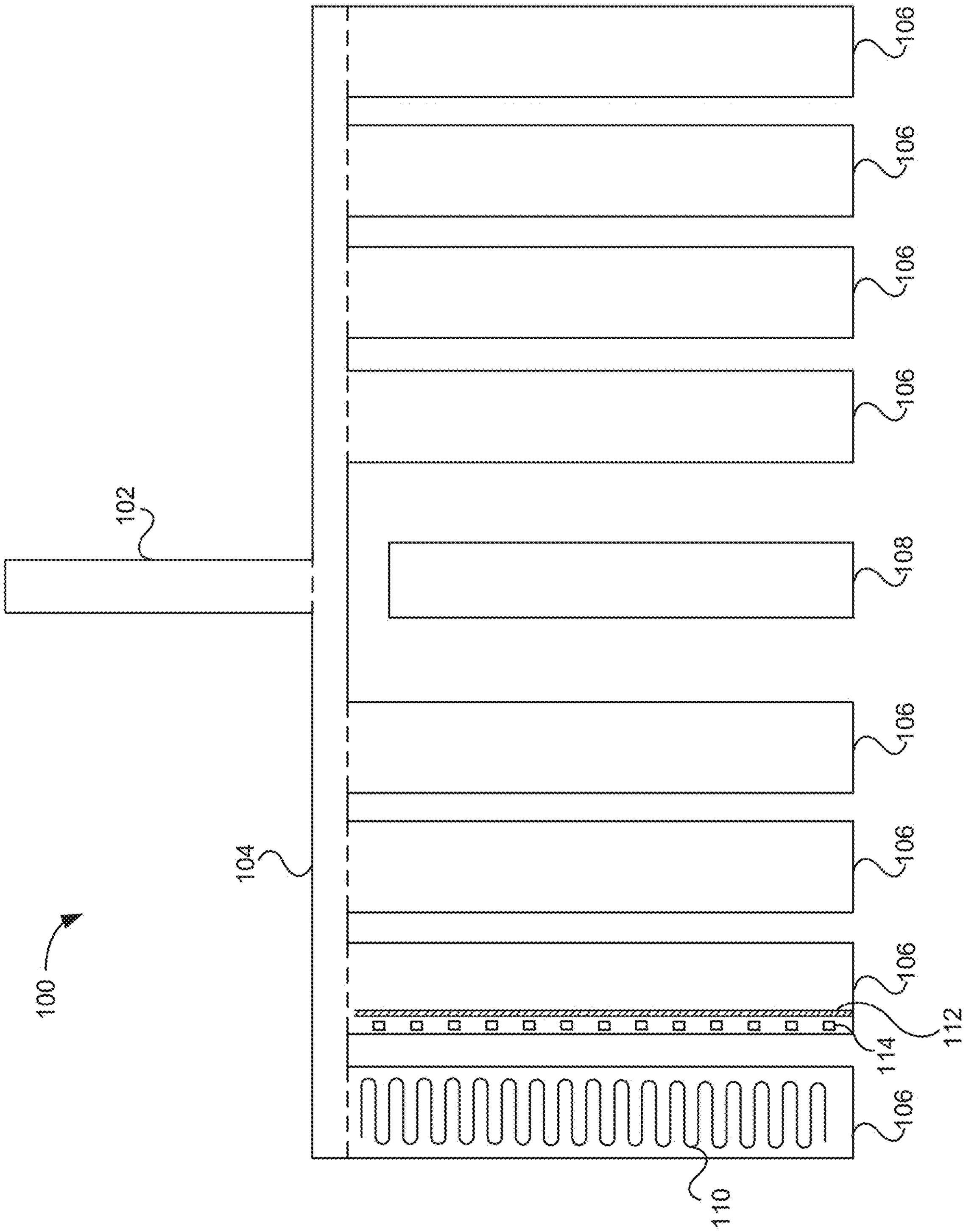
FIG. 1 illustrates a plan view of a livestock supply system, in accordance with the disclosed technology.

The present disclosure relates generally to livestock supply systems and methods and, more particularly, to continuous livestock supply systems and methods. The disclosed technology, for example, can include a system for rearing livestock and directing the livestock toward a processing plant. The system can include one or more enclosures that can house the livestock while the livestock are being reared. The enclosure can include moving walls that can automatically direct the livestock from the enclosure entrance toward the enclosure exit and eventually out the enclosure exit. The moving walls can be configured to move at a slow speed such that the livestock are slowly directed from the entrance toward the exit while the livestock are reared from offspring to the age where the livestock would be about slaughter weight. As a specific example, chicks which have recently hatched can be directed by the moving walls from the entrance toward the exit during their lifetime such that the chicks reach the exit about the time when they have grown to broilers of slaughter weight. The disclosed technology can also include a passageway connected to the exits of the one or more enclosures and a processing plant. The passageway can also include moveable walls that can automatically direct the livestock from the enclosure exit toward the processing plant. By using the moving walls to direct the livestock toward the processing plant, the processing plant can be continuously supplied livestock for processing while avoiding many of the inefficiencies associated with freighting the livestock to the processing plant previously described. Furthermore, the disclosed technology can help reduce costs associated with freighting livestock offspring and feed to the grow houses. The disclosed technology can include additional functions and features which are herein described.

Although certain examples of the disclosed technology are explained in detail, it is to be understood that other examples, embodiments, and implementations of the disclosed technology are contemplated. Accordingly, it is not intended that the disclosed technology is limited in its scope to the details of construction and arrangement of components set forth in the following description or illustrated in the drawings. The disclosed technology can be implemented in a variety of examples and can be practiced or carried out in various ways. In particular, the presently disclosed subject matter is described in the context of being a continuous supply broiler house and related methods and systems. The present disclosure, however, is not so limited, and can be applicable in other contexts. The present disclosure, for example and not limitation, can be applicable to the growing and processing of other livestock such as horses, donkeys, cattle, bison, camels, llamas, alpacas, sheep, goats, swine, chickens, turkeys, pheasants, quail, Cornish game hens, peafowl, ducks, geese, rabbits, mink, or any other type of animal raised to produce animal products. Such implementations and applications are contemplated within the scope of the present disclosure. Accordingly, when the present disclosure is described in the context of being a continuous supply broiler house, it will be understood that other implementations can take the place of those referred to.

It should also be noted that, as used in the specification and the appended claims, the singular forms "a," "an," and "the" include plural references unless the context clearly dictates otherwise. References to a composition containing "a" constituent is intended to include other constituents in addition to the one named.

Also, in describing the examples, terminology will be resorted to for the sake of clarity. It is intended that each term contemplates its broadest meaning as understood by those skilled in the art and includes all technical equivalents which operate in a similar manner to accomplish a similar purpose.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is also to be understood that the mention of one or more method steps does not preclude the presence of additional method steps or intervening method steps between those steps expressly identified. Moreover, although the term "step" can be used herein to connote different aspects of methods employed, the term should not be interpreted as implying any particular order among or between various steps herein disclosed unless and except when the order of individual steps is explicitly required. Further, the disclosed technology does not necessarily require all steps included in the example methods and processes described herein. That is, the disclosed technology includes methods that omit one or more steps expressly discussed with respect to the examples provided herein.

The components described hereinafter as making up various elements of the disclosed technology are intended to be illustrative and not restrictive. Many suitable components that would perform the same or similar functions as the components described herein are intended to be embraced within the scope of the disclosed technology. Such other components not described herein can include, but are not limited to, for example, similar components that are developed after development of the presently disclosed subject matter. Furthermore, unless explicitly stated otherwise, the various components of the described technology can be made from any suitable material including various metals, plastics, composite materials, wood, or any combination thereof. Similarly, unless explicitly stated otherwise, the various components of the described technology can be made using any suitable manufacturing process.

As used herein, the term "livestock" refers to animals raised in an agricultural setting to produce commodities such as meat, eggs, milk, fur, leather, wool, or other animal products. Furthermore, the term livestock is not limited to any particular type of animal and can include horses, donkeys, cattle, bison, camels, llamas, alpacas, sheep, goats, swine, chickens, turkeys, pheasants, quail, Cornish game hens, peafowl, ducks, geese, rabbits, mink, or any other type of animal raised to produce animal products. Accordingly, although the present disclosure is described in relation to supplying chickens (e.g., broilers) to a processing plant, the disclosed technology is not so limited and can include other livestock or animals although not specifically mentioned. In particular, the disclosed technology can relate or be applied to all types of large-scale livestock processing methods and systems.

Referring now to the drawings, in which like numerals represent like elements, examples of the present disclosure are herein described. FIG. 1 illustrates a plan view of a livestock system 100 for continuously supplying livestock to a processing plant 102. The livestock system 100 can include a passageway house 104, multiple livestock enclosures 106, and a feed mill 108, in accordance with the disclosed technology. Although depicted as having eight livestock enclosures 106 and a single passageway house 104, the layout of the various buildings and/or systems described herein can be varied depending on the particular application. For example, the disclosed technology can include one, two, three, four, five, ten, twenty, thirty, fifty or greater or fewer livestock enclosures 106 as would be suitable for the particular application. Similarly, the livestock system 100 can include one, two, three, four, five or more passageway houses 104 as would be suitable for the particular application. For example, the livestock system 100 can have thirty-six livestock enclosures 106 configured to house broilers. The thirty-six livestock enclosures 106 can be split evenly with half connected to a passageway house 104 on one side of the processing plant 102 and the other half connected to a passageway house 104 on the other side of the processing plant 102. Furthermore, the layout of the various buildings and/or systems described herein can facilitate a continuous supply of livestock delivered to the processing plant 102. As will be appreciated by one of skill in the art, by providing a system that is capable of continuously supplying the livestock to the processing plant 102, the disclosed technology can, among other benefits, result in a more efficient production process, a better product, and a higher yield than traditional systems for processing livestock.

The processing plant 102 can be any type of processing plant suitable for the application. For example, and not limitation, the processing plant 102 can be a meat processing plant for processing chicken, beef, pork, or other meats from various livestock. In other examples, the processing plant 102 can be a processing plant for processing fur, leather, tallow, gelatin, or any other suitable type of animal product. As will be appreciated by one of skill in the art, the processing plant 102 can be any type of processing plant capable of receiving a continuous supply of livestock. As described herein, the rate at which the livestock are supplied to the processing plant 102 can be varied depending on the application, including the type of livestock and the demand for the animal product. Thus, the processing plant 102 can be any size and type of processing plant for the particular application. Furthermore, although a single processing plant 102 is depicted in FIG. 1, the livestock system 100 can include as many processing plants 102 as would be suitable for the particular application.

The passageway house 104 can be located between the processing plant 102 and the livestock enclosures 106. The passageway house 104 can include a roof and walls to shield the livestock from adverse weather or other hazardous conditions or the passageway house can simply be a fence or walls intended to enclose the livestock. As will be described in greater detail herein, the passageway house 104 can be configured to help direct the livestock from the livestock enclosures 106 toward the processing plant. The passageway house 104 can be sized to receive livestock from each of the livestock enclosures 106. Furthermore, the passageway house 104 can be sized to facilitate a continuous supply of livestock being directed from the livestock enclosures 106 toward the processing plant 102 to provide a continuous supply of livestock to the processing plant 102.

The livestock enclosures 106 can be any type of enclosure suitable for the particular application. As previously described, the number of livestock enclosures 106 can be varied depending on the particular application. In particular, the number of livestock enclosures 106 can be varied depending on the requirements of the processing plant 102 and the type of livestock being processed. Furthermore, the configuration of the livestock enclosure 106 can be varied depending on the type of livestock housed within the livestock enclosure 106. For example, if the livestock enclosure 106 is to house broilers, swine, turkeys, or other livestock which are typically housed inside of an enclosure, the livestock enclosure 106 can include a roof and walls to shield the livestock from adverse weather and other hazardous conditions. In other examples, the livestock enclosure 106 can be an outdoor fenced-in area for housing larger animals such as cattle, llamas, or horses. In some examples, the livestock enclosure 106 can be an enclosure for housing broilers and can be approximately 2,400 feet long and be 54 feet wide. In other examples, the livestock enclosure 106 can be larger or smaller depending on the number and type of the particular livestock.

Each livestock enclosure 106 can be configured to house a group of livestock while the livestock are reared from offspring to full slaughter weight. For example, each livestock enclosure 106 can house a separate group of livestock with each group of livestock being a different age. In this way, livestock can be moved from each livestock enclosure 106 to the processing plant 102 via the passageway 104 when the group of livestock in each livestock enclosure 106 have reached slaughter weight. Slaughter weight can be a predetermined weight, size, or other quality (e.g., fur, wool, talon size, or other qualities of the livestock that are of desirable quality for processing) or a range of weights, sizes, or other qualities such that the livestock can be deemed ready to be sent to the processing plant. As will be appreciated by one of skill in the art, by housing livestock of different ages within each livestock enclosure 106, the processing plant 102 can be supplied with a continuous supply of livestock because each group of livestock will reach slaughter weight at different times. The livestock system 100 can include a suitable amount of livestock enclosures 106 to ensure the processing plant 102 is provided a continuous supply of livestock. In this way the disclosed technology can help to reduce the high costs and likelihood of injury associated with freighting livestock to the processing plant from growing houses that are distant from the processing plant 102. The livestock can be moved from the livestock enclosures 106 through the passageway 104 and to the processing plant 102 by being herded by workers or by other systems described more fully herein.

The livestock system 100 can include a feed mill 108. The feed mill 108 can be located proximate the livestock enclosure 106 and be configured to store and provide feed to the livestock. As will be appreciated by one of skill in the art, having a feed mill 108 located proximate the livestock enclosure 106 can help to reduce the cost associated with shipping feed to the livestock enclosures 106.

To help increase the efficiency of the livestock system 100, the livestock enclosures 106 can be configured to route the water used in the livestock enclosure 106 through the livestock enclosure 106 to provide heating and cooling to the livestock enclosure 106. For example, the livestock enclosure 106 can include a heating/cooling coil 110 that can be routed through the livestock enclosure to providing heating to the livestock enclosure 106 during cool days and cooling to the livestock enclosure 106 during warm days. In this way, the livestock system 100 can utilize the energy provided by the warmer water or cooler water to provide heating and cooling to the livestock enclosure 106. In some examples, the heating/cooling coil 110 can be installed in a flooring of the enclosure 106, in the walls of the enclosure, proximate the ceiling of the enclosure, or otherwise configured to provide heating and cooling to the livestock. The heating/cooling coil 110 can also be routed through the processing plant 102 and the passageway house 104 to provide heating and cooling to the processing plant 102 and the passageway house 104. Although depicted as only a single livestock enclosure 106 having the heating/cooling coil 110 for the sake of simplicity, each livestock enclosure 106 can include a heating/cooling coil 110.

One of the under-utilized resources associated with processing livestock is the waste that is collected from the livestock's droppings or litter. The litter can be collected and used to make fertilizer or other products. To increase the effectiveness of the litter collection, the livestock system 100 can include an auger system 112 configured to collect and remove the litter from the livestock enclosure 106. For example, the flooring of the livestock enclosure 106 can be a mesh or wire flooring that can allow the litter to fall through the flooring. The litter can then be directed toward the auger system 112 by water, a scraper system, a sliding flooring system, a conveyor belt system, or any other suitable means to direct the litter toward the auger system 112. The auger system 112 can then rotate and direct the litter out of the livestock enclosure 106 to a collection point 114. Depending on the particular application, the livestock enclosure 106 can include multiple collection points 114, as depicted in FIG. 1, or the livestock enclosure 106 can include a single collection point 114. In this way, the litter can be efficiently collected and performed in a manner that reduces the disruption to the livestock within the livestock enclosure 106. Although depicted as only a single livestock enclosure 106 having the auger system 112 and the collection points 114 for the sake of simplicity, each livestock enclosure 106 can include the auger system 112 and the collection points 114.

Although described in relation to a livestock system 100 that is connected to a processing plant 102, it will be appreciated by one of skill in the art that the technology disclosed herein can be applied to existing livestock enclosures 106. For example, the disclosed technology described herein (e.g., moveable walls 230, sizing walls 250, methods of directing the animals toward the enclosure exit 221, etc.) can be applied to existing broiler houses. In this example, the disclosed technology can be used to direct the broilers to cages located near the enclosure exit 221 such that the broilers do not need to be individually grabbed by a worker and placed in a cage. By directing the broilers to individual cages the disclosed technology, as applied to existing broiler houses, can make the process of rearing and gathering the broilers more efficient and humane and can lead to higher yield. Furthermore, as will be appreciated by one of skill in the art, the heating/cooling coils 110, auger system 112, and collection points 114 can each be applied to an existing livestock enclosure 106 to help increase the efficiency of the existing livestock enclosure.

Figure 2:
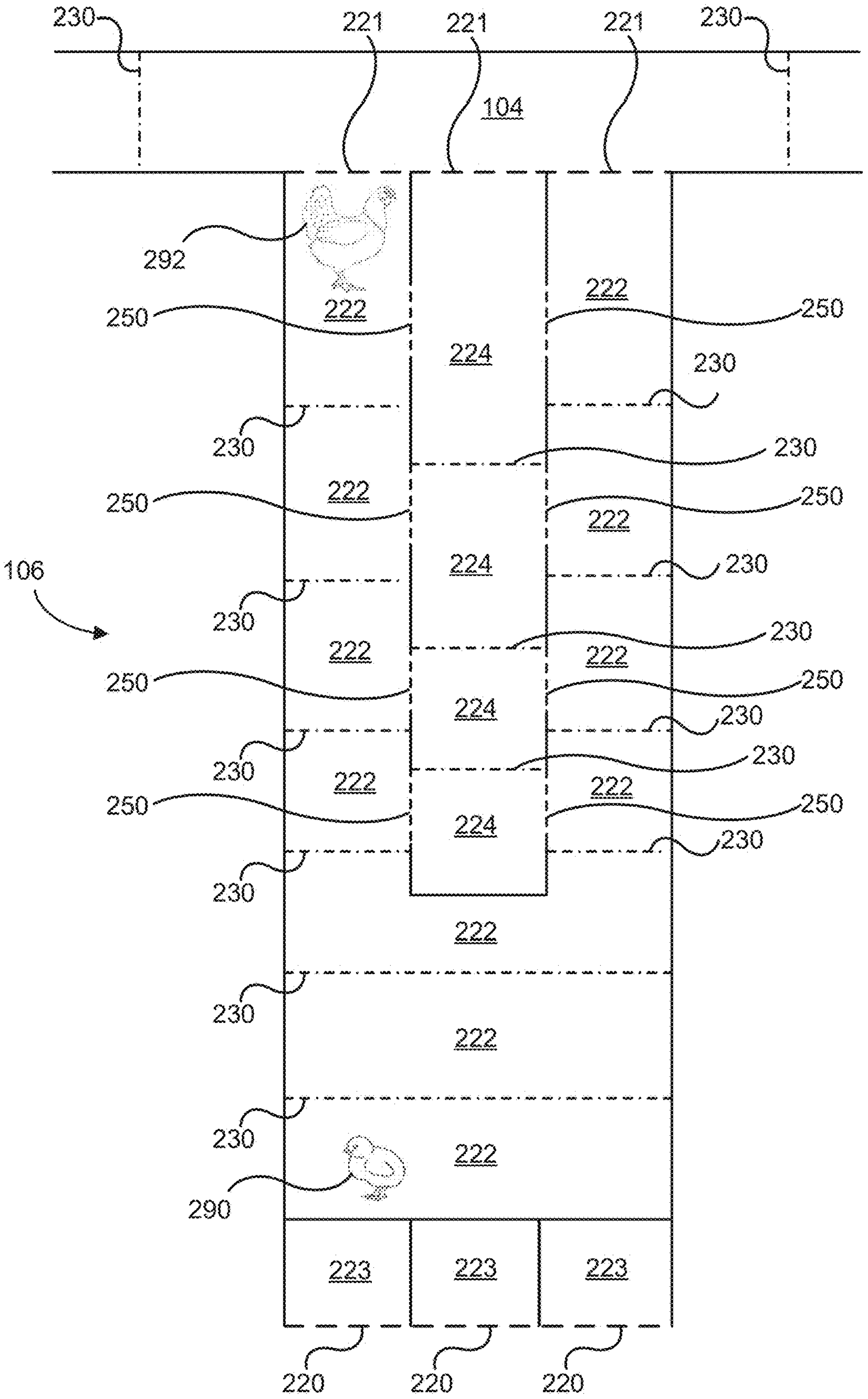
FIG. 2 illustrates a plan view of a livestock enclosure and passageway house, in accordance with the disclosed technology.

FIG. 2 illustrates a plan view of a livestock enclosure 106 and passageway house 104, in accordance with the disclosed technology. As depicted, and as will become apparent herein, the livestock enclosure 106 and the passageway house 104 can be configured to automatically direct the livestock from an entrance 220 of the livestock enclosure 106 toward a processing plant 102 such that the livestock can be delivered to the livestock enclosure 106 as offspring 290, reared within the livestock enclosure 106, and be delivered to the processing plant 102 about the time the livestock have reached the age where the livestock would be approximately at slaughter weight 292.

The livestock enclosure 106 can include an enclosure entrance 220 and an enclosure exit 221. The enclosure entrance 220 and the enclosure exit 221 can be any type of entrance and exit as would be suitable for the particular application. For example, the enclosure entrance 220 and the enclosure exit 221 can be a gate or door that can be opened and closed to permit the livestock to pass through the enclosure entrance 220 and the enclosure exit 221. In some examples, the enclosure entrance 220 and the enclosure exit 221 can be one-way doors configured to allow the livestock to pass through the door in one direction but prevent the livestock from passing back through the door in the other direction.

The livestock enclosure 106 can be partitioned into separate pens 222 by including multiple moveable walls 230. The moveable walls 230, as will be described in greater detail herein, can be configured to create multiple separate pens 222 such that groupings of livestock can be grouped together during their lifetime. For example, the moveable walls 230 can partition the livestock enclosure 106 into several separate pens 222 and each separate pen 222 can enclose a group of livestock all being of similar age and size. The moveable walls 230, for example, can create separate pens 222 that can group broilers into similar age and size depending on when the broilers were delivered to the livestock enclosure 106. Furthermore, as will be described in greater detail herein, the moveable walls 230 can be configured to move at a predetermined speed such that the livestock within the individual pens 222 can be directed from the enclosure entrance 220 to the enclosure exit 221 such that the livestock enter the enclosure entrance 220 as offspring 290 and exit the enclosure exit 221 at the age when the livestock are at approximately slaughter weight 292 (or any other appropriate measure such as fur length, body size, horn growth, etc.). Although FIG. 2 depicts the livestock enclosure 106 having a certain number of separate pens 222, the livestock enclosure 106 can be configured to include as many separate pens 222 as required by the particular application.

Similarly, the passageway house 104 can include moveable walls 230 to help direct the livestock from the livestock enclosure 106 toward the processing plant. The moveable walls 230 in the passageway house 104, however, can be configured to move at a faster or slower speed to direct the livestock toward the processing plant 102 such that the livestock reach the processing plant 102 when the processing plant 102 is ready to receive the livestock. In some examples, the speed of the moveable wall 230 in the passageway house 104 can be varied depending on the demand of the processing plant 102.

To help facilitate receiving the livestock, the livestock enclosure 106 can include one or more reception pens 223 that can receive the livestock and contain the livestock until it is determined that the livestock should be released into the separate pens 222. For example, the livestock enclosure 106 can include three separate reception pens 223 configured to receive broiler chicks and the broiler chicks can remain in the reception pens 223 until either the broiler chicks have reached a certain age or until the moveable walls 230 are in a position to receive the broiler chicks. Furthermore, by including multiple reception pens 223 the time when the livestock can be released into the livestock enclosure 106 can be staggered as would be appropriate for the given application.

To further ensure that livestock of a suitable size are delivered to the processing plant 102, the livestock enclosure 106 can include a sizing wall 250 configured to allow livestock of a first size to pass through the sizing wall 250 but prevent livestock of a second size from passing through the sizing wall 250. For example, and as will be described in greater detail herein, the sizing wall 250 can be sized to allow smaller livestock to pass through the sizing wall 250 but prevent larger livestock to pass through the sizing wall 250. In this way, livestock which are undersized and not ready to be sent to the processing plant 102 can be allowed to self-sort such that the undersized livestock are not sent to the processing plant 102 before they are ready to be processed. This can help to eliminate much of the inefficiencies associated with sorting the livestock prior to processing because the smaller livestock can sort themselves out of the group of larger livestock.

The sizing walls 250 can partition the separate pens 222 from a sizing passageway 224. The sizing passageway 224 can be configured to receive the smaller livestock which have self-sorted from the larger livestock. The sizing passageway 224 can be an area where the smaller livestock can be allowed additional time to grow to the appropriate age or weight before being sent to the processing plant 102. The sizing passageway 224 can include additional moveable walls 230 that can divide the sizing passageway 224 into multiple pens such that livestock of a similar size can be kept together. The moveable walls 230 can continue to direct these self-sorted livestock toward the processing plant 102 so that the self-sorted livestock can be sent to the processing plant 102 when they have reached suitable size. Although depicted as being near a center of the livestock enclosure 106, the sizing passageway 224 can be located near a side of the livestock enclosure 106 depending on the particular application.

Figure 3A:
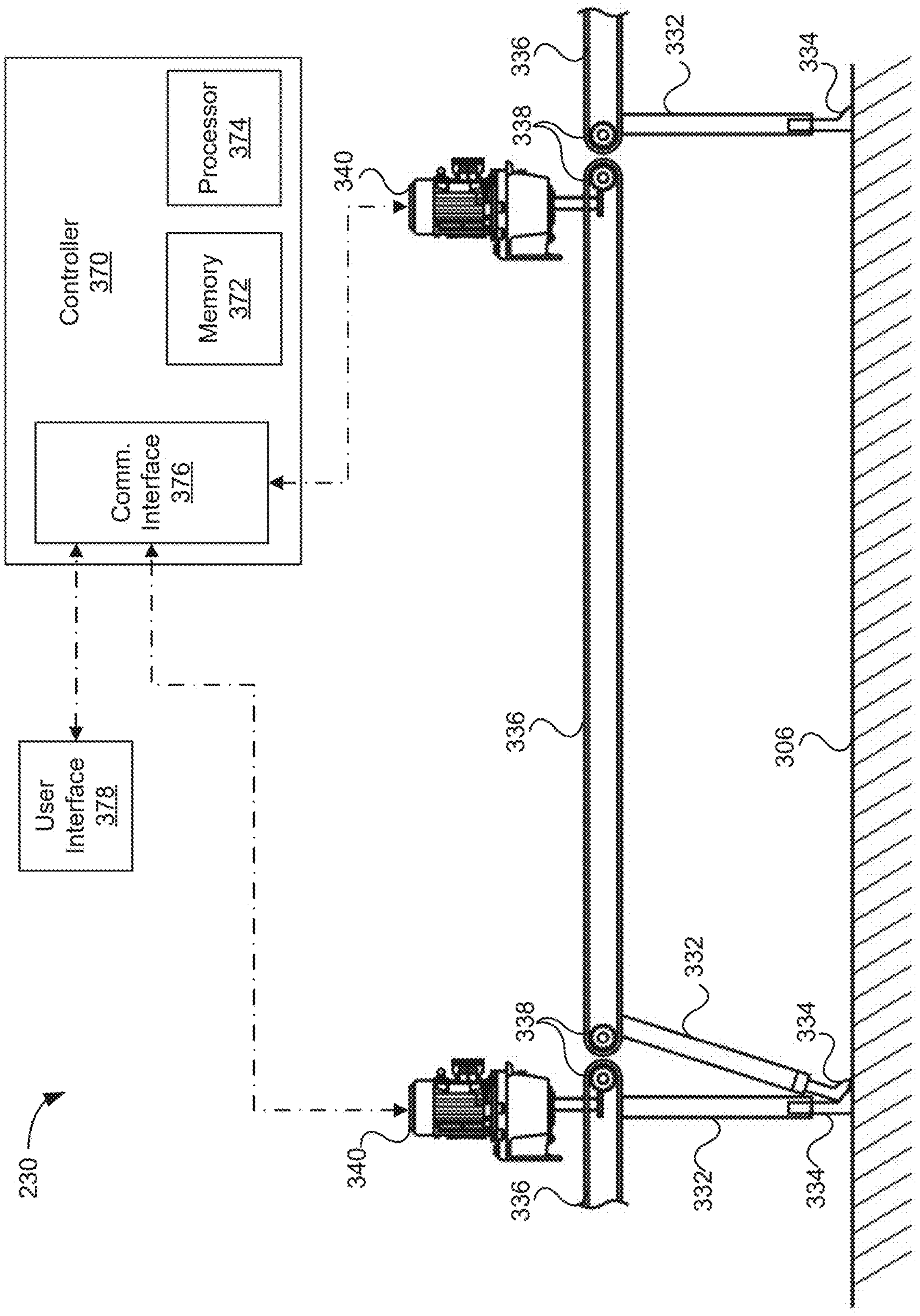
FIG. 3A illustrates a side view of a moveable wall, in accordance with the disclosed technology.

FIG. 3A illustrates a side view of a moveable wall 230, in accordance with the disclosed technology. As depicted in FIG. 3A, the moveable wall 230 can include a wall portion 332, and an extension portion 334. The wall portion 332 and the extension portion 334 can be configured to be a barrier between adjoining groupings of livestock such that the livestock can be separated into individual groups of similar age and size. In the example depicted in FIG. 3A, the wall portion 332 can be attached to a drive system 336 such that the wall portion 332 can hang from the drive system 336. The drive system 336 can be or include a system having a cable, a chain, a rope, a cord, a cable, a rail, a belt, a beam, or any other similar system configured to support the wall portion 332 and facilitate movement of the wall portion 332. The extension portion 334 can be connected to a lower end of the wall portion 332 such that the extension portion 334 can extend from the wall portion 332 to contact a floor 306 of the livestock enclosure 106.

The moveable walls 230 can each be attached to their own drive systems 336 or the moveable walls 230 can each be attached to a single drive system 336. The example depicted in FIG. 3A shows the moveable walls 230 each being attached to its own individual drive system 336 such that each moveable wall 230 can move independently of the next adjacent moveable wall 230. In this way, each moveable wall 230 can be independently controlled. In examples where each of the moveable walls 230 are attached to a single drive system 336, the moveable walls 230 can be moved together at a single speed. To change a position or location of the moveable walls 230, the moveable walls 230 can be detached from the drive system 336 such that the moveable walls 230 can be moved independently from the drive system 336.

To help facilitate moving the moveable walls 230, the drive system 336 can be in mechanical communication with sprockets 338 which can be in mechanical communication with a drive motor 340. The drive motor 340 can be an electric motor that can be controlled such that the speed of the drive motor can be varied as desired. The drive motor 340, for example, can be a brushed motor, a brushless motor, a direct drive motor, a linear motor, a servo motor, a stepper motor, or any other electric motor that can be used to facilitate movement of the moveable wall 230. Furthermore, depending on the particular application, the drive motor 340 can be powered by alternating current or direct current. As previously described, the moveable walls 230 can be moved at a slow enough rate such that the livestock can enter the livestock enclosure 106 as offspring 290 and exit the livestock enclosure 106 at a suitable age and weight (e.g., slaughter weight 292).

Depending on the configuration, the sprockets 338 can be gears, pulleys, wheels, cylinders, or any other suitable connection point that can rotate the drive system 336 to move the moveable wall 230. Similarly, the drive system 336 can be a cable, a chain, a rope, belt, cord, a threaded rod, a gear system, or any other suitable type of system to facilitate movement of the moveable wall 230.

As depicted in FIG. 3A, the wall portion 332 and the extension portion 334 can extend from the drive system 336 and can be configured to extend and abut an adjacent wall portion 332 and extension portion 334. In this way, the wall portion 332 and the extension portion 334 can be configured to receive and direct the next group of livestock that was previously directed by the adjacent wall portion 332 and extension portion 334.

Figure 3B:
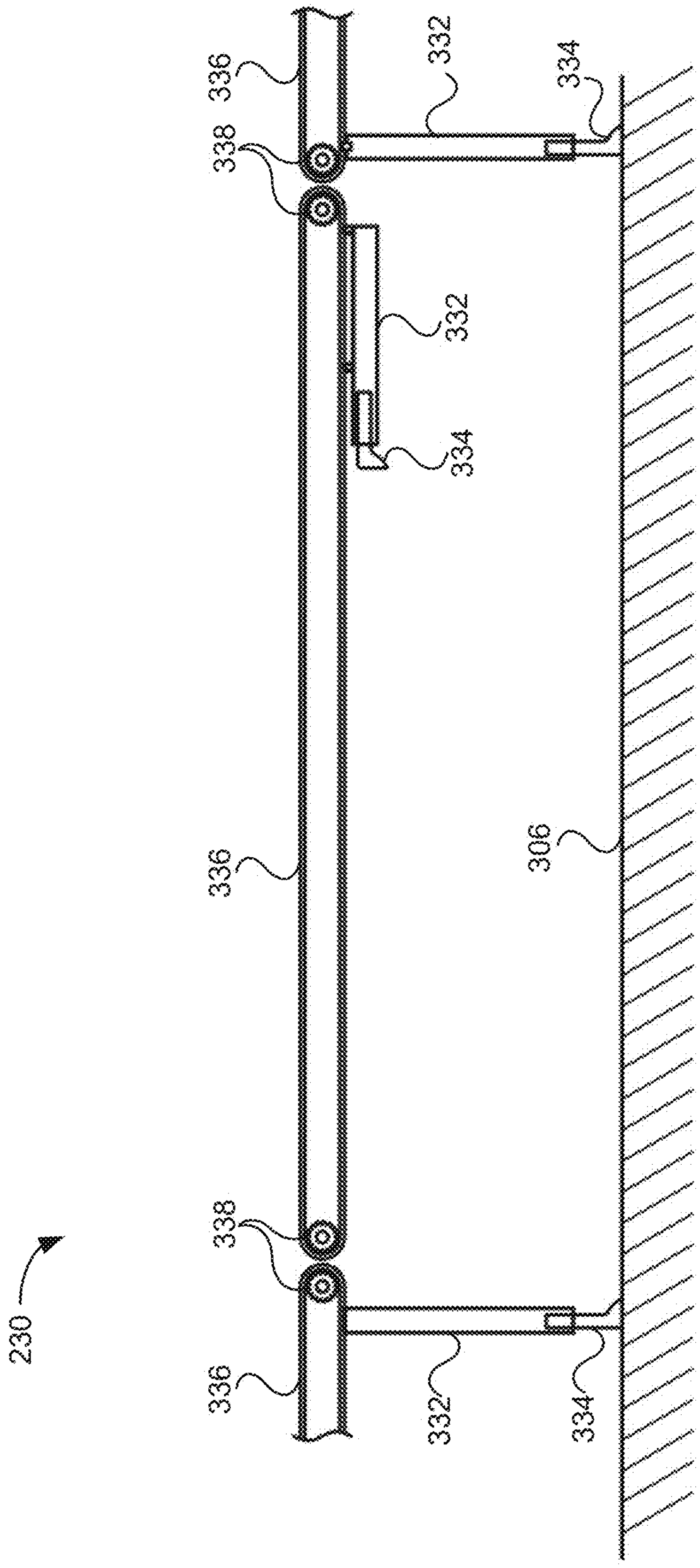
FIG. 3B illustrates another side view of a moveable wall, in accordance with the disclosed technology.

The extension portion 334 can be configured to extend from the wall portion 332 when the moveable wall 230 is in a starting position (as depicted in FIG. 3A) and retract when the moveable wall 230 is in an ending position (as depicted in FIG. 3B). Furthermore, in the example depicted in FIG. 3B, the wall portion 332 and the extension portion 334 can be configured to rotate upwards and be lifted above the livestock so that the moveable wall 230 can return to the starting position. In other examples, the extension portion 334 can be configured to retract high enough such that the wall portion 332 and the extension portion 334 are above the livestock while the moveable wall 230 is moved from the ending position to the starting position. The moveable wall 230 can return to the starting position by the drive motor 340 being operated in reverse to move the drive system 336 backwards.

To help control the speed of the moveable walls 230, the drive motor 340 can be in communication with a controller 370. For example, the controller 370 can be configured to determine when the moveable walls 230 should be moved or stopped and at what speed the moveable walls 230 should move. Furthermore, the controller 370 can be configured to receive an input from a user to cause the moveable walls 230 to change speed. For example, a user can determine that the moveable walls 230 should be sped up to increase the rate at which the livestock are supplied to the processing plant 102. As another example, a user can determine that a particular moveable wall 230 should be slowed down to allow a group of livestock a little more time to grow to reach suitable slaughter weight.

FIG. 3A includes a block diagram of the controller 370, in accordance with the disclosed technology. The controller 370 can have a memory 372, a processor 374, and a communication interface 376. The controller 370 can be a computing device configured to receive data, determine actions based on the received data, and output a control signal to the electric motor 132. One of skill in the art will appreciate that the controller 370 can be installed in any location, provided the controller 370 is in electrical communication with the electric motor 132. Furthermore, the controller 370 can be configured to send and receive wireless or wired signals and the signals can be analog or digital signals. The wireless signals can include Bluetooth™, BLE, WiFi™, ZigBee™, infrared, microwave radio, or any other type of wireless communication as may be suitable for the particular application.

The controller 370 can include a memory 372 that can store a program and/or instructions associated with the functions and methods described herein and can include one or more processors 374 configured to execute the program and/or instructions. The memory 372 can include one or more suitable types of memory (e.g., volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like) for storing files including the operating system, application programs (including, for example, a web browser application, a widget or gadget engine, and or other applications, as necessary), executable instructions and data. One, some, or all of the processing techniques or methods described herein can be implemented as a combination of executable instructions and data within the memory.

The controller 370 can also have a communication interface 376 for sending and receiving communication signals between the various components. Communication interface 376 can include hardware, firmware, and/or software that allows the processor(s) 374 to communicate with the other components via wired or wireless networks, whether local or wide area, private or public, as known in the art. Communication interface 376 can also provide access to a cellular network, the Internet, a local area network, or another wide-area network as suitable for the particular application. In this way, the livestock system 100, for example, can communicate with a server or other device to receive periodic updates to the controller 370. For example, the livestock system 100 can be configured to receive software updates from a server such that the livestock system 100 can be remotely updated.

Additionally, the controller 370 can have or be in communication with a user interface 378 for displaying system information and receiving inputs from a user. The user interface 378 can be installed locally on the livestock system 100 or be a remotely controlled device such as a mobile device. The user, for example, can view settings or other data of the livestock system 100 on the user interface 378 and input data or commands to the controller 370 via the user interface 378. For example, the user can view speed settings of the moveable walls 230 or size settings of the sizing walls 250. For example, the user can input data to the controller 370 via the user interface 378 to change the speed of the moveable walls 230.

Figure 4:
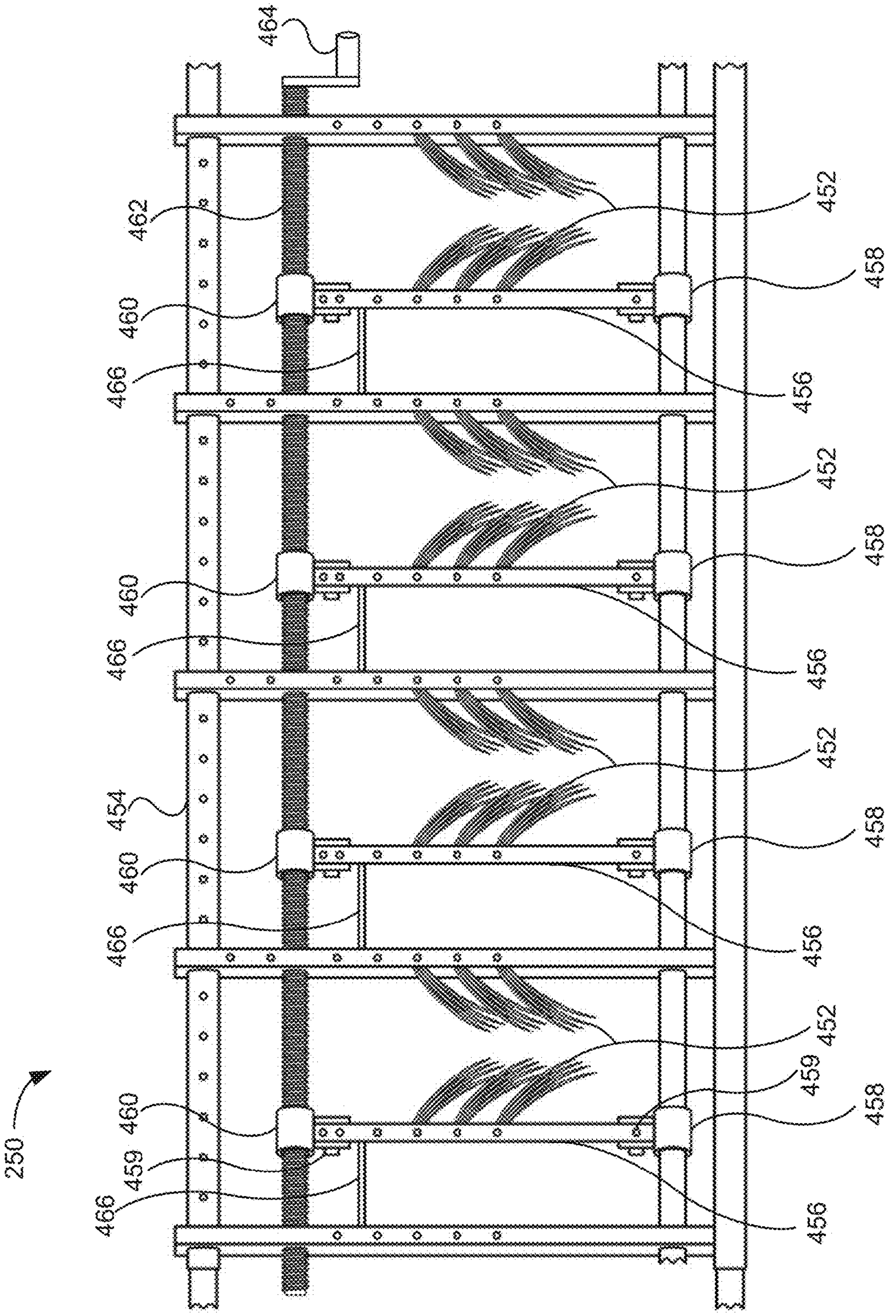
FIG. 4 is a top view of a sizing wall, in accordance with the disclosed technology.

FIG. 4 is a top view of a sizing wall 250, in accordance with the disclosed technology. As previously described in relation to FIG. 2, one or more sizing walls 250 can be positioned near the enclosure exit 221 to allow livestock that are undersized to pass into a sizing passageway 224 to allow the undersized livestock additional time to grow. The sizing wall 250 can include retention arms 452 that are supported by a support frame 454. The retention arms 452 can be configured to allow livestock to pass through the sizing wall 250 in one direction but prevent the livestock from passing back through the sizing wall 250 in the opposite direction. In some examples where smaller livestock (e.g., chickens, turkeys, rabbits, mink, etc.) are contained in the livestock enclosure 106, the retention arms 452 can be plastic or metal strips, bars, wire, or other small pieces of material that can be arranged to facilitate permitting the livestock to pass through the sizing wall 250 one direction but not another. In other examples where larger livestock are contained in the livestock enclosure 106 (e.g., cattle, swine, horses, etc.), the retention arms 252 can be made from stronger material such as larger metal or plastic rods, pipes, fences, or walls, or other larger pieces of material or assemblies of material that can be arranged to facilitate permitting the livestock to pass through the sizing wall 250 in one direction but not another. In some examples, the retention arms 452 can be configured to pivot around a hinge and be spring-loaded to return to a resting position after livestock have passed through the sizing wall 250.

The sizing wall 250 can include adjustable support arms 456 that can support the retention arms 452 a help facilitate adjustment of a gap between the retention arms 452. By adjusting the gap between the retention arms 452, the sizing wall can be configured such that a user can adjust the position of the retention arms 452 to allow livestock of varying size to pass through the sizing wall 250. For example, a gap between the retention arms 452 can be adjusted smaller if it is desirable for smaller livestock to pass through the sizing wall 250 or adjusted larger if it is desirable for larger livestock to pass through the sizing wall 250. In this way, the sizing wall 250 can be adjusted for the particular application.

In some examples, the adjustable support arms 456 can include a sliding attachment 458 that can slide along a portion of the support frame 454 and a threaded attachment 460 that can be attached to a threaded rod 462. The sliding attachment 458 and the threaded attachment 460 can be attached to the adjustable support arm 456 by attachment members 459. In some examples, the attachment members 459 can be an adjustable pin and bracket system that can allow for easily attaching the adjustable support arm 456 to the sliding attachment 458 and the threaded attachment 460. In some examples, the attachment members can include a hitch pin and a bracket with holes sized to receive the hitch pin.

The threaded attachment 460 can be moved along the threaded rod 462 by turning the threaded rod 462. As depicted in FIG. 4, the sizing wall 250 can include more than one set of retention arms 452 and the several sets of retention arms 452 can all be adjusted simultaneously as the threaded attachments 460 slide along the threaded rod 462. In some examples, the threaded rod 462 can be turned by a handle 464 attached to the threaded rod 462 for manual adjustment of the gap between the retention arms 452. In other examples, the threaded rod 462 can be adjusted by actuating an electric motor coupled to the threaded rod. As will be appreciated by one of skill in the art, the threaded attachment 460 and the threaded rod 462 are offered for explanatory purposes and other configurations can be used to adjust the gap between the retention arms 452. For example, and not limitation, the sizing wall 250 can include a gear system, a pulley system, a cable system, or other mechanical or electrical system configured to adjust a gap between the retention arms 452.

The sizing wall 250 can further include an adjustable barrier 466 that can be configured to guide livestock toward the retention arms 452 and stop livestock from passing through the sizing wall 250 at locations other than the retention arms 452. For example, as depicted in FIG. 4, the sizing wall 250 can include an adjustable barrier 466 positioned near a front portion (the top of FIG. 4) of the sizing wall 250 such that livestock are prevented from passing around the retention arms 452 and are caused to pass through the sizing wall 250 only through the retention arms 452. The adjustable barrier 466 can be configured to expand and contact as a position of the retention arms 452 is adjusted. In this way, the adjustable barrier 466 can continue to prevent livestock from passing through the sizing wall 250 at locations other than the retention arms 452 as the position of the sizing wall 250 is adjusted.

Figure 5:
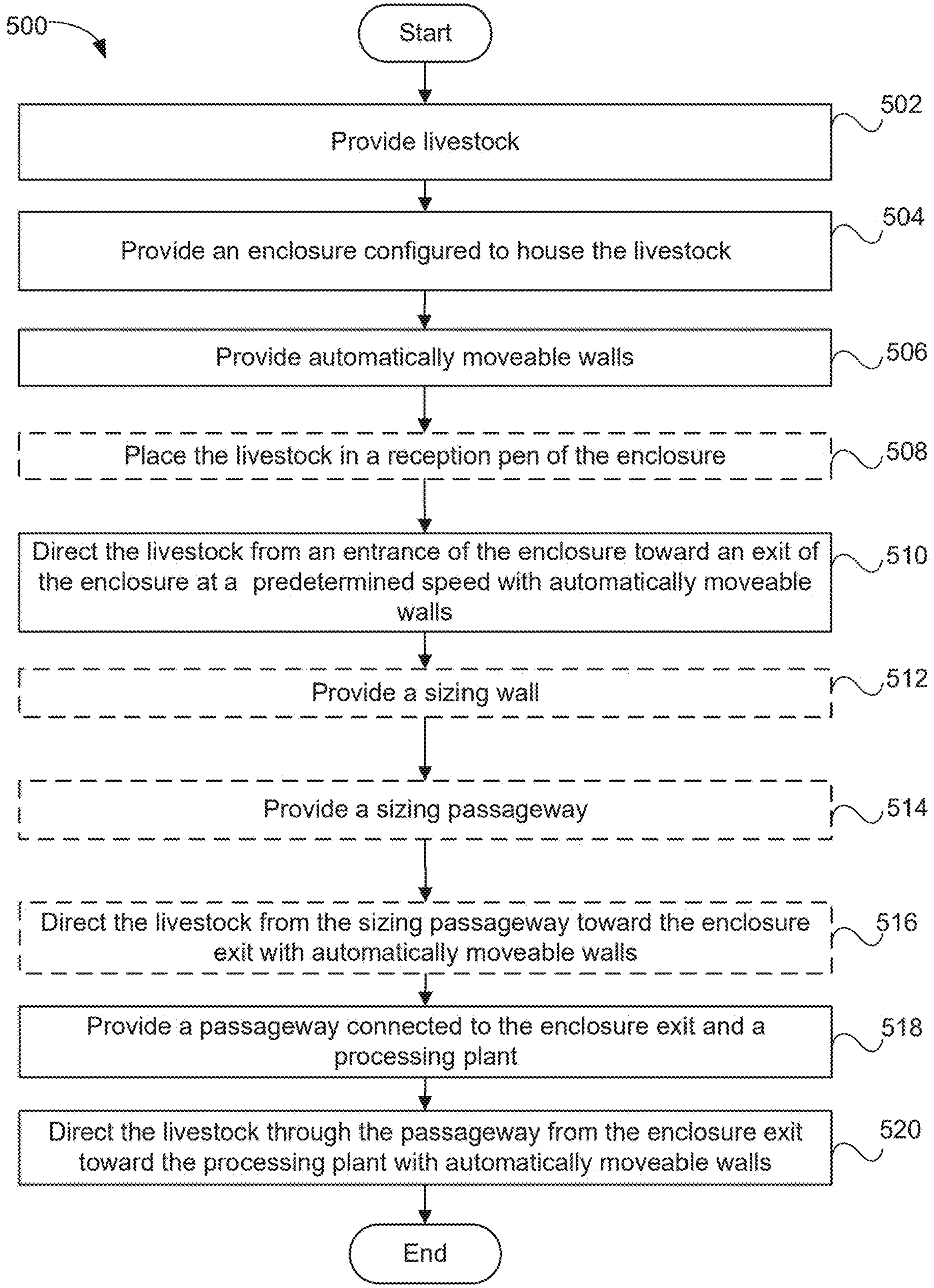
FIG. 5 is a flow chart of a method of continuously supplying livestock to a processing plant, in accordance with the disclosed technology.

FIG. 5 is a flow chart of a method 500 of continuously supplying livestock to a processing plant, in accordance with the disclosed technology. The method 500 can include all of the elements previously described herein in relation to FIGS. 1-4 and can be varied accordingly. The method 500 can include providing livestock 502 and providing 504 an enclosure configured to house the livestock. The enclosure can be or include the enclosure 106 described herein. As will be appreciated by one of skill in the art, and as explained herein, the disclosed technology can be applicable to a variety of livestock and can therefore be adapted for the particular livestock. As an example, providing livestock 502 can include providing broiler chicks, piglets, calves, or other livestock offspring. As explained herein, the disclosed technology can be used to direct the livestock offspring from the enclosure entrance toward the enclosure exit by using automatically moveable walls that are configured to move the livestock through the enclosure while the livestock are reared in the enclosure.

The method 500 can further include providing 506 automatically moveable walls. The automatically moveable walls can be or include the moveable walls 230 described herein. Optionally, the method 500 can include placing 508 the livestock in a reception pen of the enclosure if the enclosure includes a reception pen. The reception pen can be or include the reception pen 223 described herein.

The method 500 can further include directing 510 the livestock from an entrance of the enclosure toward an exit of the enclosure at a predetermined speed with the automatically moveable walls. The predetermined speed at which the automatically moveable walls can be moved can be a speed that causes the livestock to be moved from the enclosure entrance to the enclosure exit such that the livestock enter the enclosure as offspring and exit the enclosure about the time the livestock have reached slaughter weight or otherwise reached an appropriate age to be processed. For example, the automatically moveable walls can be configured to direct broiler chicks from an enclosure entrance to an enclosure exit such that the broiler chicks have been reared in the enclosure to full slaughter weight about the time the broilers reach the enclosure exit.

Optionally, the method 500 can include providing 512 a sizing wall and providing 514 a sizing passageway. As will be appreciated, the sizing wall can be or include the sizing wall 250 described herein and the sizing passageway can be the sizing passageway 224 described herein. The method 500 can also include directing 516 the livestock from the sizing passageway toward the enclosure exit with the automatically moveable walls.

In some examples, the method 500 can further include providing 518 a passageway connected to the enclosure exit and a processing plant. As will be appreciated, the passageway can be or include the passageway 104 described herein. The method 500 can include directing 520 the livestock through the passageway from the enclosure exit toward the processing plant with automatically moveable walls.

As will be appreciated, the method 500 just described and other methods described herein can be varied in accordance with the various elements and examples described herein. That is, methods in accordance with the disclosed technology can include all or some of the steps described above and/or can include additional steps not expressly disclosed above. Further, methods in accordance with the disclosed technology can include some, but not all, of a particular step described above. Further still, various methods described herein can be combined in full or in part. That is, methods in accordance with the disclosed technology can include at least some elements or steps of a first method and at least some elements or steps of a second method. Moreover, the methods described herein, or portions thereof, can be embodied in computer instructions (e.g., in a non-transitory, computer readable medium).

While the present disclosure has been described in connection with a plurality of exemplary aspects, as illustrated in the various figures and discussed above, it is understood that other similar aspects can be used, or modifications and additions can be made to the described aspects for performing the same function of the present disclosure without deviating therefrom. For example, in various aspects of the disclosure, methods and compositions were described according to aspects of the presently disclosed subject matter. But other equivalent methods or composition to these described aspects are also contemplated by the teachings herein. Therefore, the present disclosure should not be limited to any single aspect, but rather construed in breadth and scope in accordance with the appended claims.

What is claimed is:

1. A system comprising:
a drive system;
a movable partition configured to be moved by the drive system;
a controller in communication with the drive system, the controller being programmed to cause the drive system to move the movable partition at a predetermined speed to guide livestock through an enclosure; and
a sizing partition configured to permit livestock of a first size to pass through an opening of the sizing partition and prevent livestock of a second size to pass through the opening of the sizing partition, the first size being smaller than the second size.

2. The system of claim 1, wherein the sizing partition is configured to be adjusted between a first position and a second position to adjust the opening of the sizing partition.

3. The system of claim 1, wherein the system further comprises a sizing passageway, and
wherein the sizing partition is configured to permit the livestock of the first size to pass through the opening of the sizing partition into the sizing passageway and prevent the livestock of the second size to pass through the opening of the sizing partition into the sizing passageway.

4. The system of claim 1, wherein the predetermined speed is configured to cause the movable partition to move such that livestock in the enclosure enter the enclosure as offspring, are reared in the enclosure with the movable partition directing the livestock through the enclosure throughout rearing, and are directed to an enclosure exit approximately when the livestock have each reached a slaughter weight.

5. The system of claim 1, wherein the movable partition is configured to be moved from an ending position to a starting position without directing the livestock from the ending position to the starting position.

6. The system of claim 5, wherein the movable partition is configured to be lifted above the livestock to be moved from the ending position to the starting position.

7. The system of claim 1, wherein the movable partition is configured to transition between an extended position and a retracted position.

8. The system of claim 7, wherein the movable partition is configured to extend to the extended position to direct the livestock through the enclosure.

9. The system of claim 8, wherein the movable partition is configured to retract to the retracted position to be moved from an ending position to a starting position.

10. The system of claim 1 further comprising a plurality of movable partitions configured to divide the enclosure into separate pens.

11. The system of claim 10, wherein the drive system is further configured to move each movable partition of the plurality of movable partitions at the predetermined speed.

12. The system of claim 1, wherein the enclosure comprises an existing livestock enclosure and the movable partition is added to the existing livestock enclosure.

13. A system comprising:

a drive system;

a plurality of movable partitions configured to be moved by the drive system to direct livestock through an enclosure, the plurality of movable partitions configured to divide the enclosure into individual pens for separating livestock of different sizes into the individual pens;

a controller in communication with the drive system, the controller being programmed to cause the drive system to move the movable partition at a predetermined speed to guide livestock through the enclosure; and a sizing partition configured to permit livestock of a first size to pass through an opening of the sizing partition and prevent livestock of a second size to pass through the opening of the sizing partition to allow the livestock to be sorted into the individual pens based on size, the first size being smaller than the second size.

14. The system of claim 13, wherein the sizing partition is configured to be adjusted between a first position and a second position to adjust the opening of the sizing partition.

15. The system of claim 13, wherein the system further comprises a sizing passageway, and wherein the sizing partition is configured to permit the livestock of the first size to pass through the opening of the sizing partition into the sizing passageway and prevent the livestock of the second size to pass through the opening of the sizing partition into the sizing passageway.

16. The system of claim 13, wherein each movable partition of the plurality of movable partitions comprises:

a first portion; and a second portion, the second portion configured to move between an extended position and a retracted position, wherein the second portion is configured to direct the livestock when in the extended position and to be lifted above the livestock in the retracted position.

17. The system of claim 16, wherein the movable partition is configured to be moved from an ending position to a starting position when the second portion is in the retracted position without directing the livestock from the ending position to the starting position.

18. The system of claim 17, wherein the movable partition is configured to be lifted above the livestock to be moved from the ending position to the starting position.

19. The system of claim 13, wherein the predetermined speed is configured to cause the plurality of movable partitions to move such that livestock in the enclosure enter the enclosure as offspring, are reared in the enclosure with the plurality of movable partitions directing the livestock through the enclosure throughout rearing, and are directed to an enclosure exit approximately when the livestock have each reached a slaughter weight.

20. The system of claim 13, wherein the enclosure comprises an existing livestock enclosure and the plurality of movable partitions is added to the existing livestock enclosure.

* * * * *